United States Patent [19]

Fields

[11] 4,195,420
[45] Apr. 1, 1980

[54] EPISTOTOMY REPAIR MODEL

[76] Inventor: Sandra Fields, 110-26A 172nd St., Jamaica, N.Y. 11433

[21] Appl. No.: 440,518

[22] Filed: Feb. 7, 1974

[51] Int. Cl.² ............................................. G09B 23/30
[52] U.S. Cl. ........................................................ 35/17
[58] Field of Search ................................ 35/17; 46/158

[56] References Cited

U.S. PATENT DOCUMENTS

| 88,432 | 3/1869 | Aylworth | 35/17 |
| 2,324,702 | 7/1943 | Hoffman | 35/17 |
| 2,678,505 | 5/1954 | Munson | 35/17 |

Primary Examiner—Harland S. Skogquist
Attorney, Agent, or Firm—Jacob L. Kollin

[57] ABSTRACT

An anatomical model for teaching, practicing and learning the repair of an episiotomy. The model comprises a fabric cover shaped as part of a female torso and limbs and stuffing material of cotton or the like, filling out the cover. There are provided a plurality of slit fabric layers of the vagina region of the model, as well as a slit in the cover to simulate the incisions of the vaginal mucosa, muscle, fascia and the subcuticular portion of the vagina.

2 Claims, 6 Drawing Figures

EPISTOTOMY REPAIR MODEL

BACKGROUND OF THE INVENTION

During the process of child delivery it sometimes becomes necessary to make an incision of the vagina including its associated structure. This is performed when a jagged tear of the vagina appears inevitable, in order to obtain a clean cut and to direct a tear away from the sphincter. Such an incision is known as an episiotomy. When made along the line of union of the symmetrical parts of the vulva, it is known as a median episiotomy.

The repair of the episiotomy following delivery follows an established technic requiring considerable skill.

The present invention has for its object the provision of a model of an episiotomy comprising the perineum, vagina and its associated portions which may be used for teaching and practicing the repair of the episiotomy. The model is not in imitation of the human organs, but only to permit demonstrations, teaching and practicing the repair of an episiotomy.

This and other objects of the invention will become apparent from the following description and the accompanying drawing. It is to be understood, however, that these are given by way of illustration and not of limitation and that changes may be made in the detail construction, form and size of the parts, without affecting the scope of the invention sought to be protected.

Figure 1:
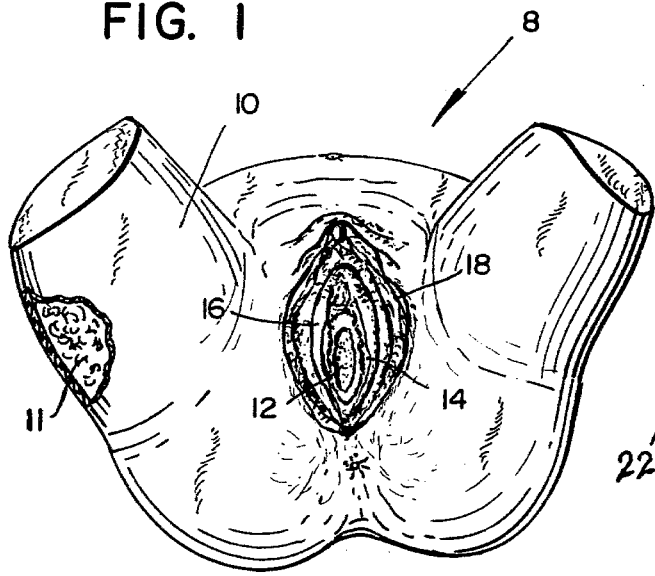
FIG. 1 is a front view of the model according to the invention showing the vagina, following an episiotomy.
Figure 6:
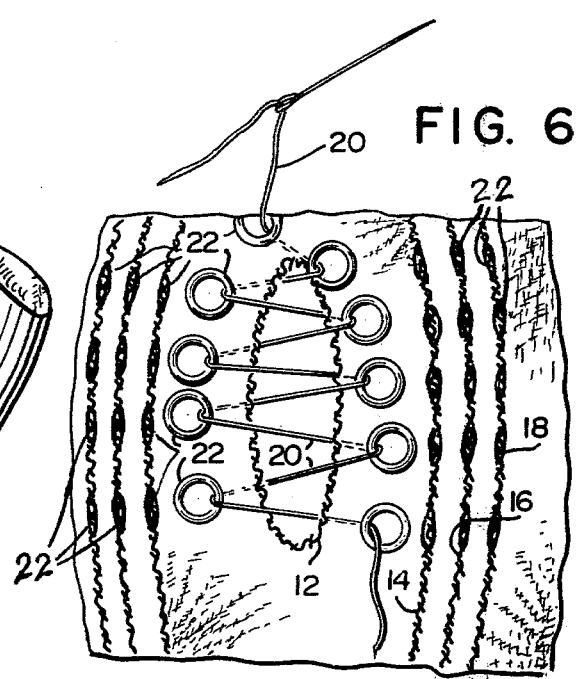
FIG. 6 is an enlarged detail of the vagina portion of the model, showing the mucosa in the process of repair.
Figure 2:
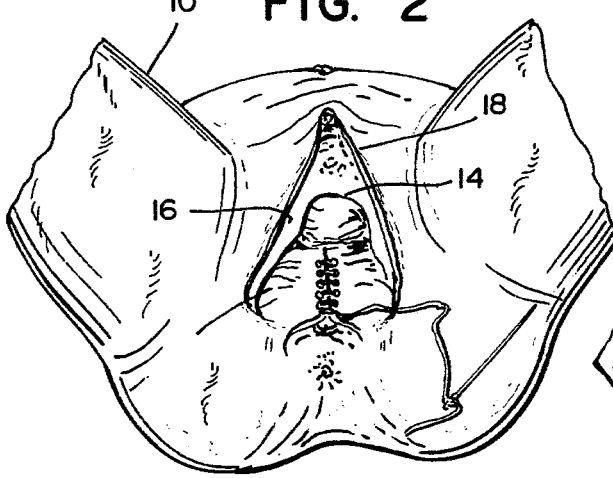
FIG. 2 illustrates the vaginal mucosa, as simulated in the model, after its repair.
Figure 3:
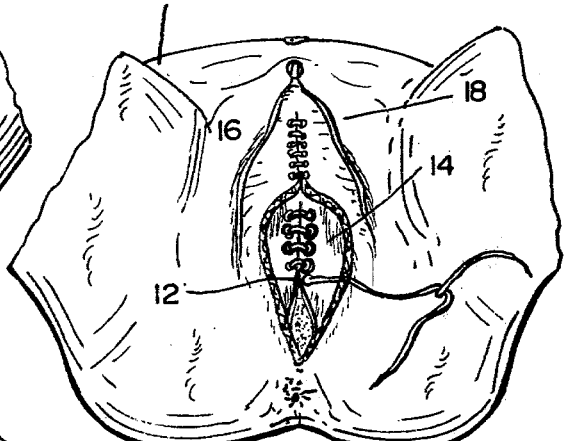
FIG. 3 illustrates the simulated muscle of the model.
Figure 4:
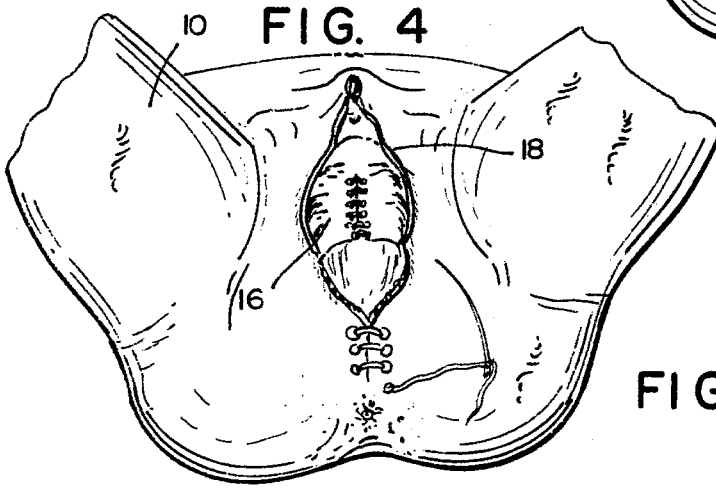
FIG. 4 illustrates the subcutaneous fascia or fibrous tissue which lies deep under the skin.
Figure 5:
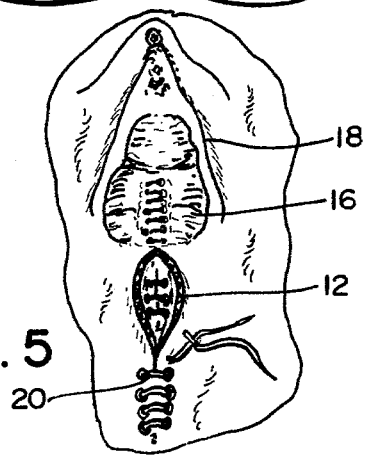
FIG. 5 illustrates the subcuticular portion of the vagina.

Referring now to the drawing in detail, the model comprises a torso and limb portion formed by stuffing an appropriately shaped fabric cover 10 with a suitable filling material 11, such as cotton or the like. The fabric may be velvet or other appropriate flexible fabric. Secured innermost of the fabric cover 10 adjacent perineum or middle portion of the stuffing 11 is a longitudinally slit fabric layer 12 representing the vaginal mucosa. Superimposed on fabric layer 12 is fabric layer 14, similarly slit and representing the muscle portion of the vagina. A further slit fabric layer 16 is positioned over fabric layer 14, to represent the fascia or a sheet of fibrous tissue lying deep in the skin. Finally the model's cover fabric 10 is likewise slit along a median line to form two edge portions 18, representing the subcuticular portion of the model.

The methods of repair of an episiotomy are well known. However, to the best of the applicant's knowledge there has not heretofore been available a model for teaching or practicing these methods. The embodiment of the model illustrated in the drawing is employed for demonstration and practice of a repair of a median episiotomy i.e. one wherein an incision has been made along the raphe or the line of union of the symmetrical parts of the perineum. It will be apparent that the scope of the invention may also include a model of a lateral episiotomy wherein the incisions are made transversely to the line of union of symmetrical parts. It may also be constructed to represent a median-lateral episiotomy.

In order to minimize wear and tear on the model during repeated practice with catgut sutures such as are shown in the drawings, the slit portions of the fabric layers may be provided with holes reinforced by grommets 22 for the passage of the sutures.

The repair of the episiotomy model is performed, according to the known method, by initially sewing together the slit portions of fabric layer 12, followed by those of fabric layer 14, fabric layer 16 and finally fabric layer 18, by passing a needle and thread or catgut in known manner.

Having thus disclosed my invention, what I claim and desire to secure by Letters Patent of the United States is:

1. A model for demonstrating teaching and practicing the repair of an episiotomy comprising a fabric cover shaped as a portion of a female torso and limbs including a simulated vagina, stuffing material filling out said fabric cover, a plurality of slit fabric layers forming symmetric edge portions in said simulated vagina along a line of a union of symmetrical parts of a vulva, said fabric layers representing respectively the vaginal mucosa, muscle, fascia and the subcuticular portion of said simmulated vagina, said symmetric edge portions being provided with spaced holes for the passage of needle and catgut therethrough.

2. The model as claimed in claim 1, wherein said holes are reinforced with grommets.

* * * * *